United States Patent
Bauer et al.

(10) Patent No.: US 6,702,079 B2
(45) Date of Patent: Mar. 9, 2004

(54) HYDRODYNAMIC CLUTCH ARRANGEMENT

(75) Inventors: Thomas Bauer, Grossbardorf (DE); Peter Frey, Gerolzhofen (DE); Ruthard Knoblach, Bergrheinfeld (DE); Christoph Sasse, Schweinfurt (DE)

(73) Assignee: Mannesmann Sachs AG, Schweinfurt (DE)

(*) Notice: Subject to any disclaimer, the term of this patent is extended or adjusted under 35 U.S.C. 154(b) by 0 days.

(21) Appl. No.: 10/073,757

(22) Filed: Feb. 11, 2002

(65) Prior Publication Data

US 2002/0117369 A1 Aug. 29, 2002

(30) Foreign Application Priority Data

Feb. 28, 2001 (DE) .......................................... 101 09 495

(51) Int. Cl.[7] ............................................. F16H 45/02
(52) U.S. Cl. .................. 192/3.29; 192/70.2; 192/107 R
(58) Field of Search ................................. 192/3.29, 3.3, 192/70.2, 107 R

(56) References Cited

U.S. PATENT DOCUMENTS

| | | | | |
|---|---|---|---|---|
| 4,153,147 A | * | 5/1979 | Chana ........................ | 192/3.28 |
| 5,209,330 A | * | 5/1993 | Macdonald ................. | 192/3.29 |
| 5,211,270 A | | 5/1993 | Tamura et al. ............. | 192/3.29 |
| 5,441,135 A | * | 8/1995 | Worner et al. ............. | 192/3.29 |
| 5,533,602 A | * | 7/1996 | Worner et al. ............. | 192/3.29 |
| 5,918,713 A | * | 7/1999 | Shimizu et al. ............ | 192/3.29 |
| 6,293,380 B1 | | 9/2001 | Arhab ........................ | 192/3.29 |

FOREIGN PATENT DOCUMENTS

DE    198 26 351    12/1999

* cited by examiner

*Primary Examiner*—Saul Rodriguez
(74) *Attorney, Agent, or Firm*—Cohen, Pontani, Lieberman & Pavane

(57) ABSTRACT

A hydrodynamic clutch arrangement, particularly a torque converter or fluid coupling, includes a housing arrangement, a turbine wheel provided in the housing arrangement, and a lockup clutch arrangement by which a torque transmitting connection can be produced selectively between the turbine wheel and the housing arrangement. The lockup clutch arrangement includes at least two friction members which are rotatable with one of the housing arrangement and turbine wheel, and at least one counter-friction member which is interposed between the two friction members and is rotatable with the other of the housing arrangement and turbine wheel. A first friction facing on at least one of the friction members at its first side faces the at least one counter-friction member. This at least one of the friction members can be brought into frictional interaction, via a second friction facing, with another counter-friction member on its second side located opposite to the first side. The first friction facing has a larger friction surface area than the second friction facing.

10 Claims, 3 Drawing Sheets

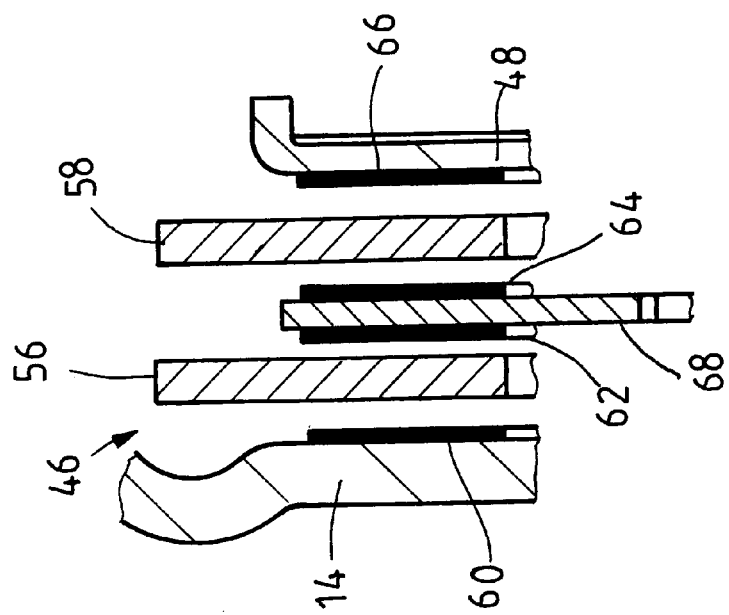
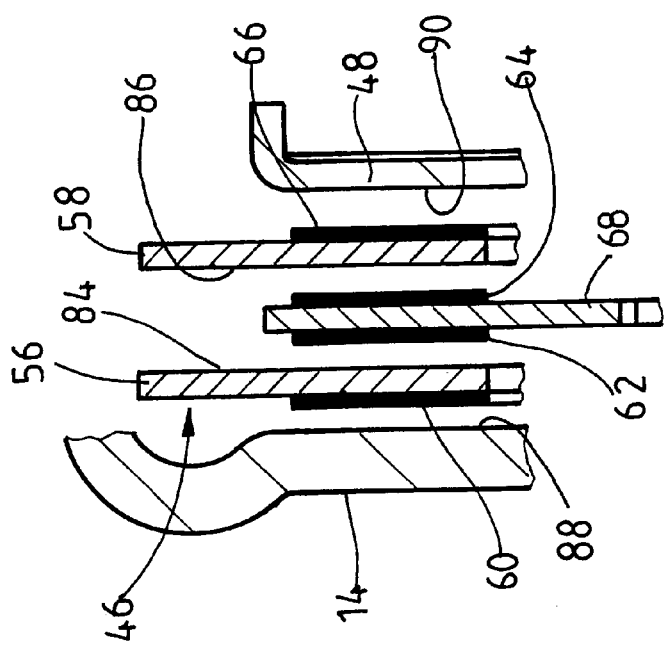

HYDRODYNAMIC CLUTCH ARRANGEMENT

BACKGROUND OF THE INVENTION

1. Field of the Invention

The present invention is directed to a hydrodynamic clutch arrangement, particularly a torque converter or fluid coupling, including a housing arrangement, a turbine wheel provided in the housing arrangement, and a lockup clutch arrangement by which a torque transmitting connection can be produced selectively between the turbine wheel and the housing arrangement. The lockup clutch arrangement includes at least two friction members which are rotatable with one of the housing arrangement and turbine wheel, at least one counter-friction member which is rotatable with the other of the housing arrangement and turbine wheel being interposed between two friction members.

2. Description of the Related Art

U.S. Pat. No. 6,293,380 discloses a hydrodynamic clutch arrangement in the form of a hydrodynamic torque converter. In this hydrodynamic torque converter, two friction members in the form of plates similar to friction disks are coupled with the turbine wheel for common rotation. These two plates lie between a clutch piston and an area of the housing arrangement. Friction surfaces with which corresponding friction surfaces at the two plates can be brought into contact are provided at the clutch piston and also at this area of the housing arrangement. Further, as an additional counter-friction member coupled with the housing arrangement for common rotation, a friction plate constructed in the manner of a ring disk is provided between the two friction members which are constructed as plates. This friction plate is pressed between the two plate-like friction members when the clutch piston is displaced. Friction facings are provided at the two friction members or plates at both sides, so that these friction facings can enter into frictional contact with the clutch piston or housing arrangement on the one hand and with the counter-friction member constructed as a ring disk on the other hand. Ultimately, this means that, in the area the friction members, the friction surface regions provided in this area are formed by surface regions of the friction facings, while metal surfaces form the friction surface regions in the area of the counter-friction members, i.e., the clutch piston, the structural component part which is constructed in the manner of a ring disk and located between the two friction members, and the housing arrangement.

The basic problem in a hydrodynamic clutch arrangement constructed in this way is that a comparatively large thermal load occurs in case of friction heat occurring in slip operation of the lockup clutch arrangement, particularly in the counter-friction element which is constructed in the manner of a ring disk and is located between the two plate-like friction elements. This is due to the fact that, first, this friction acts upon this structural component part over a large portion of its surface, so that there is only poor conduction of heat away from this structural component part. Also, its dimensions, particularly its thickness, are appreciably smaller, for example, than the clutch piston or housing arrangement in the area acted upon by friction, so that heat distribution in a larger volume area is also not possible in this case. Due to the nonuniform heating of the components or component areas in question during friction operation, local overheating can occur, so that damage to or failure of the entire lockup clutch arrangement can be caused in this overheated area in spite of the fact that other areas are not thermally overloaded.

U.S. Pat. No. 5,211,270 discloses a hydrodynamic clutch arrangement with a lockup clutch arrangement in which a counter-friction element which is constructed in the manner of a ring disk is connected with the housing arrangement so as to be rotatable. This counter-friction element constructed as a ring disk is located between a friction element which is constructed in the manner of a plate and a clutch piston which, in this case, is to be considered as an additional friction element which is rotatable in common with the plate-like friction element. In this arrangement also, the above-mentioned problem of local overheating due to comparatively poor capacity to dissipate heat can arise in the counter-friction element which is constructed as a ring disk and which is not provided with friction facings.

DE 198 26 351 discloses a hydrodynamic clutch arrangement in the form of a hydrodynamic torque converter in which the clutch piston as well as an abutment element are connected with the housing arrangement so as to be rotatable. Two plate-shaped friction members which have friction facings and are coupled with the turbine wheel for common rotation are located between these two elements. A counter-friction member which is constructed as a ring disk is located between these two friction members and, together with the abutment element and the clutch piston and another counter-friction member which is constructed as a ring disk and directly adjoins the clutch piston, is rotatable with the housing arrangement. In this arrangement, particularly in the region of the counter-friction member which is constructed as a ring disk and is interposed between the two friction members, there is a risk of local overheating due to the comparatively poor heat dissipation from this region.

SUMMARY OF THE INVENTION

It is the object of the present invention to further develop a hydrodynamic clutch arrangement of the type described above in such a way that the risk of local overheating due to heat generated in the region of the lockup clutch arrangement can be reduced or eliminated.

According to the present invention, this object is met by a hydrodynamic clutch arrangement, particularly a torque converter or fluid coupling, including a housing arrangement, a turbine wheel provided in the housing arrangement, and a lockup clutch arrangement by which a torque transmitting connection can be produced selectively between the turbine wheel and the housing arrangement. The lockup clutch arrangement includes at least two friction members which are rotatable with one of the housing arrangement and turbine wheel, at least one counter-friction member which is rotatable with the other of the housing arrangement and turbine wheel and which is interposed between two friction members. A first friction facing in at least one of the friction members at its first side faces the at least one counter-friction member. This at least one of the friction members can be brought into frictional interaction, via a second friction facing, with another counter-friction member on its second side located opposite the first side.

According to the invention, it is further provided that the first friction facing has a larger friction surface region than the second friction facing.

In a construction of this kind, it is ensured that a friction surface which is increased relative to other friction surface regions involved in friction is provided in the region of the at least one counter-friction member, so that heat concentrated on a smaller surface region or volume area can be prevented and the heat generated by friction can be distributed in an improved manner.

Further, in a construction of the type mentioned above, the second friction facing can be provided at the at least one of the at least two friction members.

The additional counter-friction member can comprise, for example, the housing arrangement, but can also or additionally comprise a pressing element of the lockup clutch arrangement.

In a construction of this type, a particularly advantageous operation can be achieved when the housing arrangement, the pressing element and the at least one counter-friction member are coupled with one another so as to rotate in common.

In this case, the at least two friction members are then preferably coupled with the turbine wheel for common rotation.

According to another advantageous feature of the present invention, the above-stated object is met by a hydrodynamic clutch arrangement, particularly a torque converter or fluid coupling, comprising a housing arrangement, a turbine wheel provided in the housing arrangement, and a lockup clutch arrangement by which a torque transmitting connection can be produced selectively between the turbine wheel and the housing arrangement. The lockup clutch arrangement includes at least two friction members which are rotatable with one of the housing arrangement and turbine wheel, at least one counter-friction member which is rotatable with the other of the housing arrangement and turbine wheel being interposed between two friction members.

According to the invention, a friction facing is provided on at least one side of the at least one counter-friction member for frictional interaction with the friction member located opposite to this side.

In a construction of the type mentioned above, the frictional load on the at least one counter-friction member can be reduced on at least one side of this at least one counter-friction member by providing a friction facing at this structural component part. However, a friction facing can preferably be provided at both sides of the at least one counter-friction member. In this way, excessive thermal loading of the at least one counter-friction member is extensively eliminated on both axial sides.

In such a construction of the hydrodynamic clutch arrangement according to the invention, a friction facing is preferably provided on at least one of the at least two friction members on the side of the same remote of the at least one counter-friction facing, wherein the at least one of the at least two friction members can be brought into frictional interaction with another counter-friction member by means of this friction facing. Alternatively, it is also possible that at least one of the at least two friction members can be brought into frictional interaction with another counter-friction member at its side remote of the at least one counter-friction member, and that a friction facing is provided at the other counter-friction member.

The additional counter-friction member can comprise, for example, the housing arrangement, but can also comprise a pressing element of the lockup clutch arrangement.

In this case, also, it is advantageous when the housing arrangement, the pressing element and the at least one counter-friction member are coupled with one another for common rotation. The at least two friction members are then advantageously coupled with the turbine wheel for common rotation.

According to another advantageous feature of the present invention, it can be provided further that at least one of the at least two friction members has a base body which has a greater thickness than a base body of the at least one counter-friction member.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 3 shows a detailed view of the components of another alternative constructional type of the hydrodynamic clutch arrangement according to the invention which enter into frictional interaction with one another; and FIG. 4 is a view corresponding to FIG. 3 showing another modified constructional type of the hydrodynamic clutch arrangement according to the invention.

DETAILED DESCRIPTION OF THE PRESENTLY PREFERRED EMBODIMENTS

Figure 1:
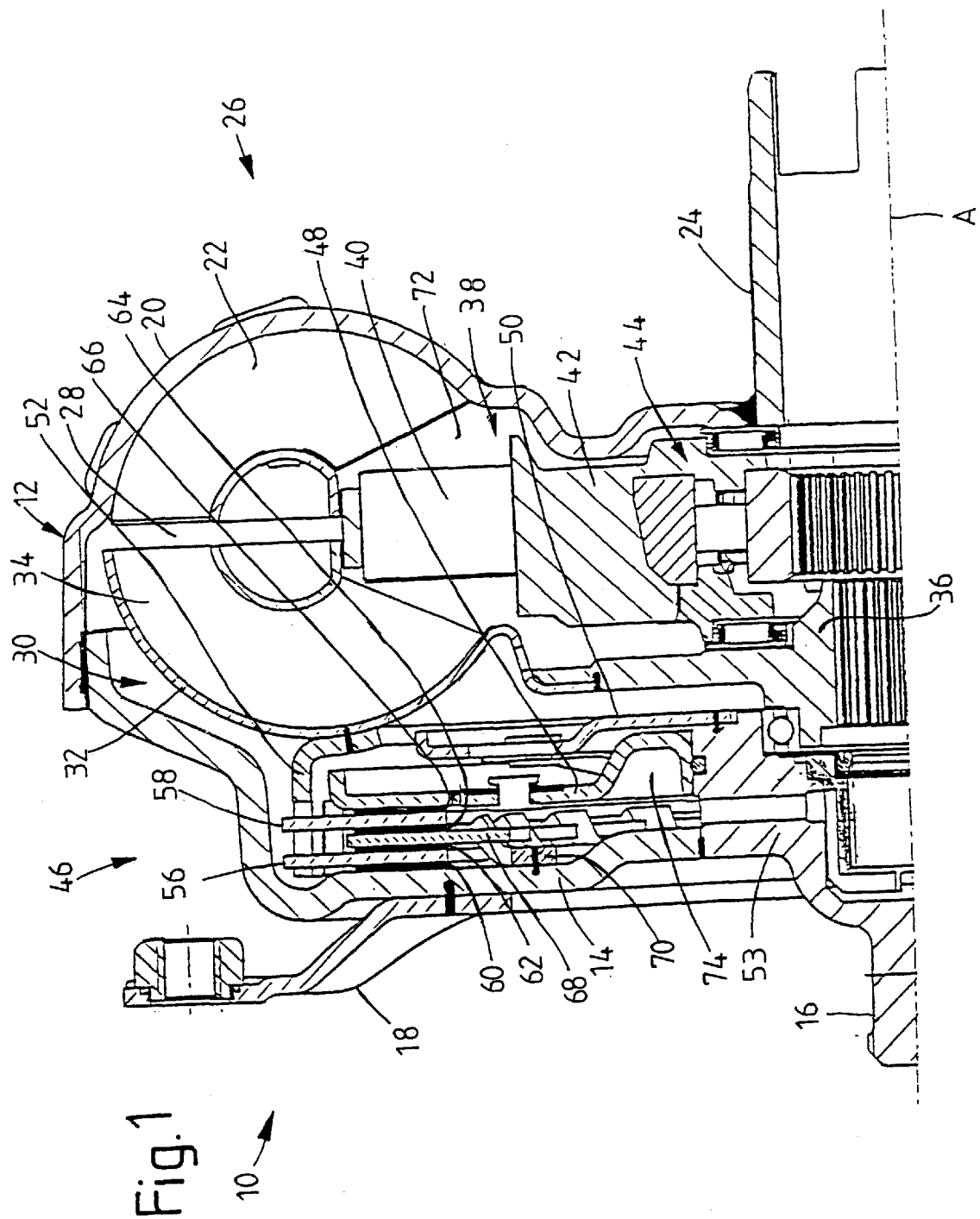
FIG. 1 shows a partial longitudinal section through a hydrodynamic clutch arrangement in the form of a hydrodynamic torque converter.

Before the steps according to the invention are examined in detail, the construction of a hydrodynamic clutch arrangement of the type mentioned in the beginning will be described in general with reference to FIG. 1.

The hydrodynamic clutch arrangement which is in the form of a hydrodynamic torque converter 10 comprises a housing arrangement 12. The housing arrangement 12 in turn comprises a housing cover 14 which is connected in its central region with a housing hub 53 carrying a bearing pin 16 and which can be connected via a coupling arrangement 18 to a drive shaft, for example, a crankshaft of a combustion engine. An impeller wheel shell 20 is fixedly connected in a radial outer area with this housing cover 14, e.g., by welding. The impeller wheel shell 20 is curved out in its radial outer region and in this region carries a plurality of impeller wheel blades 22. The impeller wheel shell 20 is fixedly connected in its radial inner region to an impeller wheel hub 24 which is arranged concentric to an axis of rotation A. The impeller wheel shell 20, together with the impeller wheel hub 24 and impeller wheel blades 16, essentially forms an impeller wheel 26.

A turbine wheel 30 is arranged in the interior 28 of the housing arrangement 12. This turbine wheel 30 comprises a turbine wheel shell 32 which carries a plurality of turbine wheel blades 34 in its radial outer, curved region. In the inner area, the turbine wheel shell 32 is connected with a turbine wheel hub 36. A driving member, not shown, for example, a transmission input shaft, can be driven in rotation by the torque converter 10 according to the invention via the turbine wheel hub 36.

A stator wheel 38 is located between the impeller wheel 26 and the turbine wheel 30. This stator wheel 38 comprises a plurality of stator wheel blades 40 which are arranged on a stator wheel ring 42. The stator wheel ring 42 is supported, via a freewheel arrangement 44, on a supporting element, not shown, which is concentric to the impeller wheel hub 24 and to the driven shaft, also not shown, and is arranged between these two component elements, the stator wheel ring 42 being supported in such a way that it is rotatable in one direction about the axis of rotation A but is prevented from rotating in the other direction.

Further, the torque converter 10 has a lockup clutch arrangement 46. This comprises a clutch piston 48 which is supported at the housing hub 53 so as to be fixed with respect to rotation but axially movable relative to it. A driver ring 52 is arranged at the turbine wheel shell 32 so as to be fixed with respect to rotation relative to it. Two essentially ring-shaped plates are connected as friction members 56, 58 to this driver ring 52 so as to be fixed with respect to rotation relative to it via corresponding teeth. Each of these plates carries two friction facings 60, 62, 64, 66. The friction facing 60 of the plate 56 located nearest to the housing cover 14 can be brought into frictional contact with an inner surface region of the housing cover 14 located opposite to it, and the friction facing 66 of the plate 58 located nearest to the clutch piston 48 can be brought into frictional contact with a corresponding friction surface region of the clutch piston 48. A counter-friction member 68 which is constructed essentially as a ring disk is located between these two friction members 56, 58 which are constructed as plates and are rotatable with the turbine wheel 30. This counter-friction member 68 is coupled via another toothed driver ring 70 to the housing arrangement 12 and housing cover 14 so as to be fixed with respect to rotation relative to the latter and can be brought into contact with these friction facings 62, 64 in its radial outer region in the friction surface regions located opposite the friction facings 62, 64.

By increasing the fluid pressure in the spatial region 72 formed between the clutch piston 48 and the impeller wheel shell 20 in relation to the fluid pressure provided in the spatial region formed essentially between the clutch piston 48 and housing cover 14, the clutch piston 48 is pressed in the direction of the housing cover 14. Frictional interaction takes place between the oppositely located friction surface regions of the clutch piston 48, plates 56, 58 and friction facings 60, 62, 64, 66 of the same, the counter-friction disk which essentially forms the counter-friction member 68, and the housing cover 14, so that torque can be transmitted from the housing cover 14 and housing arrangement 12 to the turbine wheel 30 by means of the lockup clutch arrangement 46.

It should be noted that the basic construction of a hydrodynamic clutch arrangement has been described above only to the extent necessary for understanding the present invention. Of course, other constructions can be provided in widely different areas.

Figure 2:
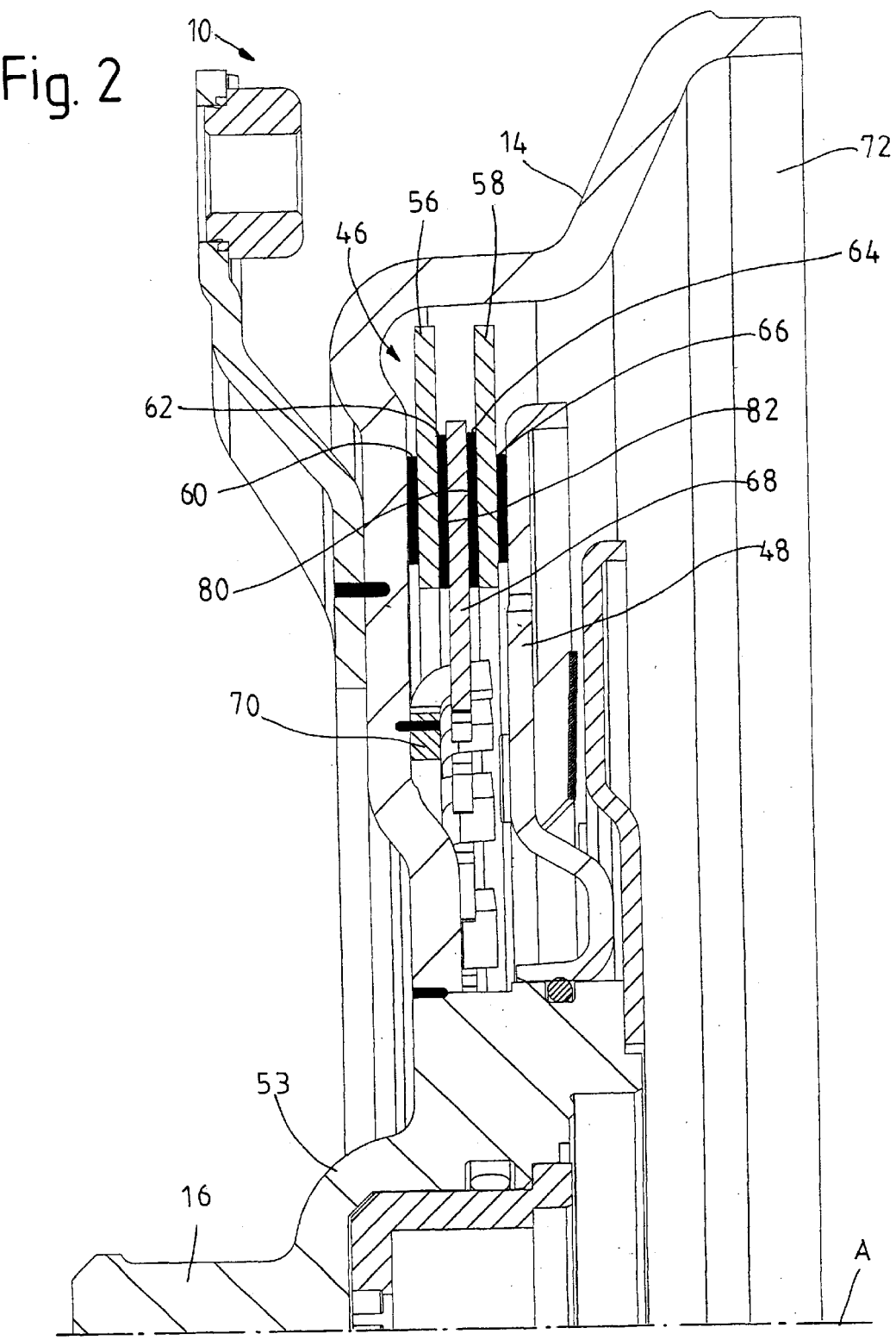
FIG. 2 is an enlarged view showing a partial longitudinal section through a hydrodynamic clutch arrangement which is constructed according to the invention.

FIG. 2 shows a construction, according to the invention, of the torque converter 10 and lockup clutch arrangement 46 of the same. It will be seen that the two friction facings 62, 64 which interact frictionally with the first counter-friction member 68 have greater radial dimensions than the friction facings 60, 66 which enter into frictional interaction with the housing cover 14 and clutch piston 48, which serve as second and third counter-friction members. This results in a configuration in which the friction surface provided in the region of the friction facings 62, 64 which are constructed substantially annularly is greater than the corresponding friction surface of the friction facings 60, 66. Therefore, there is also a larger friction surface region 80, 82 in the area of the counter-friction disk 68 on each axial side. The friction heat generated in slip operation or lockup operation is accordingly distributed over a larger surface region and volume area from the start, so that local thermal overloading of the counter-friction disk 68 in the area in which it is acted upon by friction can be prevented.

Depending on the actual construction design, it is, of course, also possible in this variant to construct the friction facings 62, 64 with a greater axial extension than friction facings 60, 66 on the radial outer side or radial inner side, as the case may be.

An alternative embodiment form of the hydrodynamic clutch arrangement according to the invention is shown in FIG. 3. Components which correspond to components described above are designated by the same reference numbers.

It will be seen that in this construction variant, the two friction facings 62, 64 which are located between the plate 56 and the counter-friction disk 68 or between plate 58 and counter-friction disk 68 are now provided or arranged at the counter-friction disk 68. Further, the friction facings 60, 66 at the other axial sides of the plates 56, 58 are provided at these plates 56, 58. This results in an arrangement in which friction surface regions 84, 86, 88, 90 provided at the plate 56, plate 58, housing arrangement 14 and clutch piston 48 are formed of the material from which these structural component parts are constructed, that is, generally metallic material. The thermal loading is accordingly better distributed to all structural component parts of the lockup clutch arrangement 46. In the area of the counter-friction disk 68, the friction heat is generated at the surface of the friction facings 62, 64, so that there is practically no thermal loading of the body material of the counter-friction disk 68. Also, the plates 56, 58 are thermally loaded to a comparatively slight extent because they are acted upon by friction only at one axial side directly in the area of their body material.

Another construction according to the invention is shown in FIG. 4. In a modification of the variant shown in FIG. 3, there are no longer any friction facings provided on the two plates 56, 58 which are coupled with the turbine wheel so as to rotate in common. Rather, the two friction facings 60, 66 are now also arranged at the housing cover 14 and clutch piston 48. In order to reduce the thermal loading in the area of the plates 56, 58 in an arrangement of this kind, these plates 56, 58, as shown in FIG. 4, can be provided with a greater axial thickness, that is, for example, with a thickness greater than the thickness of the metallic base body of the counter-friction disk or, if required, even greater than the thickness of the metal material from which the clutch piston 48 or the housing cover 14 is made.

It will be noted that, of course, the construction principles shown in FIGS. 3 and 4 can be combined with the modified radial dimensioning shown in FIG. 2. It is also possible, of course, to combine the two variants according to FIGS. 3 and 4 and, for example, to provide two friction facings at the plate 56 and no friction facing at plate 58 or to provide one friction facing at one plate and two friction facings at the other plate. Further, it is self-evident that the principle according to the invention can also be applied when the plates 56, 58 are coupled with the housing arrangement and also, if required, with the clutch piston so as to rotate in common and the counter-friction disk 68 is coupled with the turbine wheel. It is also possible, of course, to provide more than two plates and consequently more than one counter-friction disk while adhering to the construction principles according to the invention.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic clutch arrangement comprising a housing arrangement, a turbine wheel in said housing arrangement, and a lock-up clutch arrangement for selectively producing a torque transmitting connection between the turbine wheel and the housing arrangement, said lock-up clutch arrangement comprising two friction members which are rotationally fixed with respect to one of said housing arrangement and said turbine wheel, each said friction member having a first side and an opposed second side, said first sides being mutually facing, each of said friction members having a first friction facing on said first side, a first counter-friction member which is interposed between said friction members and is rotationally fixed with respect to the other of said housing arrangement and said turbine wheel, said first counter-friction member having opposing sides which can frictionally engage respective said friction facings on respective said first sides of said friction members, a second counter-friction member adjacent to the second side of one of said friction members, and a second friction facing between said second counter-friction member and said second side of said one of said friction members, wherein said first friction facing on said one of said friction members has a substantially larger surface area than the second friction facing.

2. A hydrodynamic clutch arrangement as in claim 1 wherein said second friction facing is provided on the second side of said friction members.

3. A hydrodynamic clutch arrangement as in claim 1 wherein said second counter-friction member comprises said housing arrangement.

4. A hydrodynamic clutch arrangement as in claim 1 wherein said first and second friction facings have substantially annular shapes, said first friction facing having a larger radial dimension than said second friction facing.

5. A hydrodynamic clutch arrangement as in claim 1 further comprising a third counter-friction member adjacent to the second side of the other of said friction members, and a third friction facing between the third counter-friction member and the second side of the other of said friction members, wherein said first friction facing on the other of said friction members has a substantially larger surface area than the third friction facing.

6. A hydrodynamic clutch arrangement as in claim 5 wherein said third friction facing is provided on the second side of said other of said friction members.

7. A hydrodynamic clutch arrangement as in claim 5 wherein said first and third friction facings have substantially annular shapes, said first friction facing having a larger radial dimension than said second friction facing.

8. A hydrodynamic clutch arrangement as in claim 5 further comprising a pressing element for bringing said friction members and said counter-friction members into mutual engagement, said third counter-friction element comprising said pressing element.

9. A hydrodynamic clutch arrangement as in claim 8 wherein said housing arrangement, said pressing element, and said first counter-friction member are coupled together for common rotation.

10. A hydrodynamic clutch arrangement as in claim 9 wherein said friction members are coupled to said turbine wheel for common rotation.

* * * * *